(12) United States Patent
Sands et al.

(10) Patent No.: US 7,763,830 B2
(45) Date of Patent: *Jul. 27, 2010

(54) GRILLING COMPONENT

(75) Inventors: Jeffrey L. Sands, Freeport, IL (US); Ronald J. Glavan, Rockton, IL (US); Henry Thomas Ewald, Roselle, IL (US); Ronald J. Dorsten, Oak Park, IL (US); Curtis J. Scadden, Madison, WI (US); Richard J. Lunden, Brimfield, MA (US); Ad Verkuylen, Boise, ID (US)

(73) Assignee: Restaurant Technology, Inc., Oak Brook, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/474,641

(22) Filed: Jun. 26, 2006

(65) Prior Publication Data

US 2006/0237422 A1 Oct. 26, 2006

Related U.S. Application Data

(63) Continuation of application No. 10/726,017, filed on Dec. 2, 2003, now Pat. No. 7,067,769.

(51) Int. Cl.
*A47J 37/06* (2006.01)
*F27B 9/24* (2006.01)
*F27B 9/36* (2006.01)
*F27B 9/38* (2006.01)

(52) U.S. Cl. .................. 219/388; 219/403; 99/443 C

(58) Field of Classification Search .................. None
See application file for complete search history.

(56) References Cited

U.S. PATENT DOCUMENTS 3,646,880 A * 3/1972 Norris ................ 99/349
3,739,712 A * 6/1973 Duning ............... 99/349

(Continued)

FOREIGN PATENT DOCUMENTS

EP 655215 5/1995

(Continued)

OTHER PUBLICATIONS

PCT Search Report, mailed Oct. 19, 2006.

(Continued)

*Primary Examiner*—Joseph M Pelham
(74) *Attorney, Agent, or Firm*—Ryndak & Suri LLP

(57) ABSTRACT

A vertical grilling component includes two grilling structures separated by a gap. Each grilling structure includes a heating component and a conveyor belt positioned around the heating components. The upper portion of one of the grilling structures is beveled approximately 0.8°. The grilling structures are slidable relative to the frame of the grilling component for cleaning, and the heating components are also removable from the grilling structures. The gap between the grilling structures is adjustable between two distances. The conveyor belts include a v-belt received in a groove of the pulleys to prevent lateral movement of the conveyor belt. The conveyor belts also include an edge seal around the outer edge of the conveyor belt. After grilling, seasoning is dispensed onto the grilled food item when detected by a sensor.

22 Claims, 8 Drawing Sheets

U.S. PATENT DOCUMENTS

| | | | | |
|---|---|---|---|---|
| 3,952,643 | A * | 4/1976 | Wolfelsperger et al. | 99/386 |
| 4,072,092 | A * | 2/1978 | Kohli et al. | 99/386 |
| 4,262,586 | A * | 4/1981 | Miller et al. | 99/345 |
| 4,281,594 | A * | 8/1981 | Baker et al. | 99/386 |
| 4,448,793 | A * | 5/1984 | Akesson | 99/384 |
| 4,548,130 | A * | 10/1985 | Diener et al. | 99/345 |
| 5,044,264 | A * | 9/1991 | Forney | 99/386 |
| 5,458,051 | A * | 10/1995 | Alden et al. | 99/349 |
| 5,588,354 | A * | 12/1996 | Stuck et al. | 99/386 |
| 5,847,362 | A * | 12/1998 | Sissons et al. | 219/388 |
| 6,201,218 | B1 * | 3/2001 | Chandler et al. | 219/388 |
| 6,223,650 | B1 * | 5/2001 | Stuck | 99/386 |
| 6,281,478 | B2 * | 8/2001 | Chandler et al. | 219/388 |
| 6,717,111 | B2 | 4/2004 | Sands et al. | |
| 7,059,467 | B2 | 6/2006 | Sands et al. | |
| 7,067,769 | B2 * | 6/2006 | Sands et al. | 219/388 |

FOREIGN PATENT DOCUMENTS

| | | |
|---|---|---|
| JP | 45-27794 | 10/1970 |
| JP | 49-110874 | 10/1974 |
| JP | 51-118871 | 10/1976 |
| JP | 60-129014 | 7/1985 |
| JP | 4-164414 | 6/1992 |
| JP | 53-37797 | 12/1993 |
| SE | 513 106 | 7/2000 |
| WO | WO 03/088796 A1 | 10/2003 |

OTHER PUBLICATIONS

Japanese Office Action mailed Feb. 5, 2008.
European Patent Office, Supplementary European Search Report, European Patent Application No. 04813145.2, Oct. 5, 2009.

* cited by examiner

GRILLING COMPONENT

REFERENCE TO RELATED APPLICATION

This application is a continuation application of U.S. Ser. No. 10/726,017, which was filed on Dec. 2, 2003 now U.S. Pat. No. 7,067,769.

BACKGROUND OF THE INVENTION

The present invention relates generally to a vertical grilling component having a beveled portion that grills frozen food.

Grills or griddles are used to cook various foods, such as hamburgers. In one prior grill, the sides of the food are grilled separately. The food is placed on a flat grill portion, grilling the side of the food that contacts the flat grill portion. After that side of the food is cooked, the food is manually flipped to cook the opposite side of the food. After the food is cooked, the food is manually removed from the grill for serving.

In another prior grill, both sides of the food are grilled simultaneously. After programming the type of food into a control unit, the food is placed on a lower grill portion. A platen having an upper grill portion is then lowered over the food, positioning the food between the upper and lower grill portions and simultaneously grilling both sides of the food. After lowering the platen, the distance between the upper and lower grill portions is automatically adjusted according to the type of food programmed into the control unit. After a predetermined amount of time has passed, the platen rises, and the food is manually removed from the grill.

Another prior grill employs a conveyor belt positioned over a heating component. The food is manually placed on the conveyor belt by an operator and grilled while the conveyor belt travels over the heating component.

Another prior grill includes two conveyor belts separated by a gap. As the food travels in the gap, the food is cooked. The flat grilling surfaces of the grill are usually parallel, creating a gap having a constant width. A drawback to this grill is that it is difficult to position the food in the opening of the gap.

SUMMARY OF THE INVENTION

A vertical grilling component includes two grilling structures separated by a gap. Each grilling structure includes a heating component and a conveyor belt moveable around each of the heating components. Each grilling structure also includes a drive pulley and a non-drive pulley to move the conveyor belts. Food items traveling in the gap between the two grilling structures are grilled by the heating components. The upper portion of one of the grilling structures has a beveled portion angled approximately 0.8° from the grilling surface of the grilling components.

The grilling structures are slidable along the frame of the grilling component to allow for cleaning. One of the grilling structures is removably attached to another component, such as a freezer that stores and cools the food items. When the grilling structures are attached, they do not slide relative to the frame. When the grilling structures are detached, one grilling structure can slide horizontally along the frame relative to the grilling structure attached to the component.

The heating components are also removable from the grilling structures. Each heating component includes two rails slidable along the tracks of the frame of the grilling structure. The heating components are retained in the grilling structures by a latching mechanism. The latching mechanism is released to allow the heating components to slide relative to the grilling structure to remove the heating components from the grilling structure.

The gap between the grilling structures is adjustable between two dimensions. One of the grilling structures includes a handle pivotally attached to the grilling structure by two arms. Each arm includes two bearings. The other of the grilling structures includes an attachment arm having two arched surfaces. When the grilling structures are attached, one of the arched surfaces of the attachment arm is received between the two bearings. The gap is adjusted between the two dimensions by moving the bearings between the two arched surfaces.

The conveyor belts of the grilling components include a v-belt proximate to each of the outer edges of the conveyor belt. The v-belts are received in a groove in the pulleys, preventing lateral movement of the conveyor belts during operation. The conveyor belts also include an edge seal around the outer edges of the conveyor belt to prevent grease and water in the gap from leaking into the heating component.

After grilling, the food items are dropped from the grilling component and onto an exit ramp. When a sensor detects a food item on the exit ramp, seasoning is dispensed onto the food item. The food item is then ready for serving.

These and other features of the present invention will be best understood from the following specification and drawings.

BRIEF DESCRIPTION OF THE DRAWINGS

The various features and advantages of the invention will become apparent to those skilled in the art from the following detailed description of the currently preferred embodiment. The drawings that accompany the detailed description can be briefly described as follows.

DETAILED DESCRIPTION OF THE PREFERRED EMBODIMENT

Figure 1:
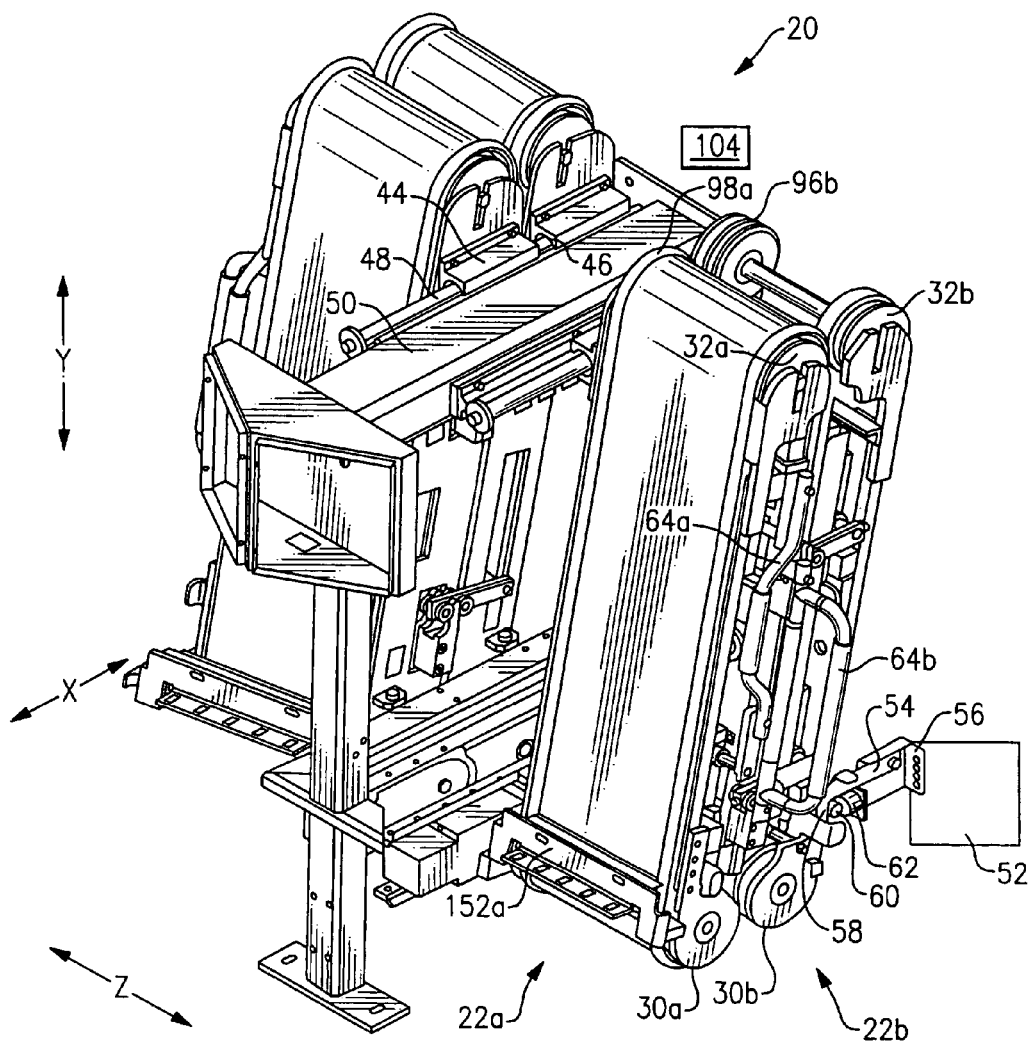
FIG. 1 schematically illustrates a perspective view of the grilling component of the present invention.

FIG. 1 schematically illustrates the vertical grilling component 20 of the present invention. The grilling component 20 includes two grilling structures 22a and 22b separated by a gap 24 that defines a cooking area. More than one grilling component 20 can be employed to increase cooking capacity.

Figure 2:
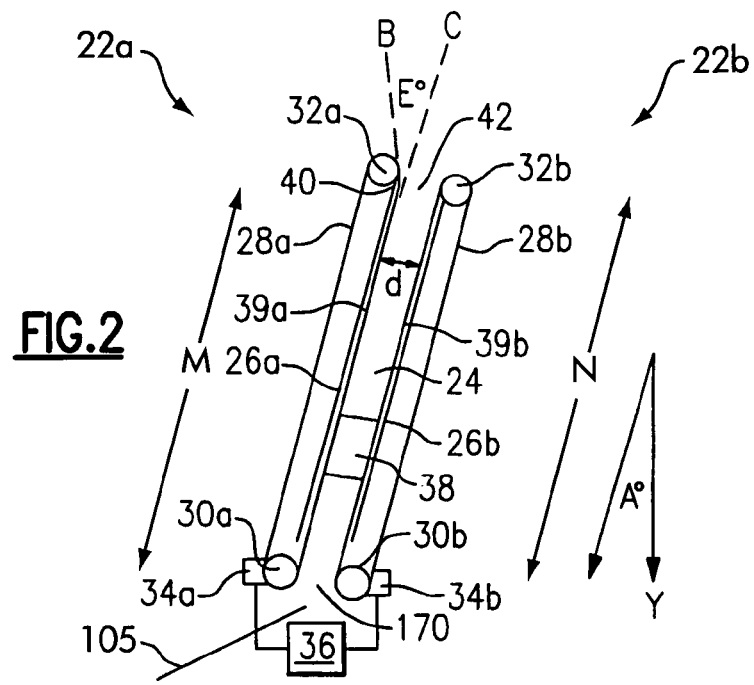
FIG. 2 schematically illustrates a side view of the grilling structures of the grilling component.

As shown in FIG. 2, each grilling structure 22a and 22b includes a heating component 26a and 26b, respectively. In one example, the heating components 26a and 26b are electric resistance heaters and heat to a temperature of 400° F. A conveyor belt 28a and 28b positioned around each of the heating components 26a and 26b, respectively, creates a surface that travels over the heating components 26a and 26b.

Preferably, the grilling structures 22a and 22b are obliquely oriented at an angle of A° from the vertical Y direction (i.e., up and down in FIGS. 1 and 2). In one example, the angle A is 5°. However, it is to be understood that other angles A are possible.

The conveyor belts 28a and 28b are preferably made of any suitable material having a low coefficient of thermal expansion. In one example, the conveyor belts 28a and 28b are made of non-stick coated Invar™ commercially available from Imphy S.A. Corporation of Paris, France. Invar™ is a metal alloy comprised of Iron and 36% Nickel, and may include other trace elements. In one example, the non-stick coating on the Invar™ is Teflon™ commercially available from E.I. du Pont de Nemours and Company of Wilmington, Del. Invar™ has a low constant of thermal expansion and therefore expands very little when heated. Although Invar™ has been disclosed, it is to be understood that other materials having a low coefficient of thermal expansion can be used.

Each grilling structure 22a and 22b includes a drive pulley 30a and 30b, respectively, and a non-drive pulley 32a and 32b, respectively. A first distance M is defined between the drive pulley 30a and the non-drive pulley 32a of the grilling structure 22a, and a second distance N is defined between the drive pulley 30b and the non-drive pulley 32b of the grilling structure 22b. The first distance M is substantially equal to the second distance N. Drive pulleys 30a and 30b are powered by respective drive motors 34a and 34b to move the conveyor belts 28a and 28b. A drive controller 36 provides a control signal to the drive motors 34a and 34b to synchronize the speed of the conveyor belts 28a and 28b.

Food items 38 traveling in the gap 24 between the conveyor belts 28a and 28b are heated and grilled by the heating components 26a and 26b. The food items 38 are squeezed within the gap 24 and therefore do not slip between the conveyor belts 28a and 28b during grilling.

The inner grilling surfaces 39a and 39b of the grilling structures 22a and 22b are substantially parallel and extend along the plane C. The upper portion 40 of the grilling structure 22a is beveled and deviates along the plane B. An angle E is defined between the plane B and the plane C. Preferably, the angle E is 0.8°. However, the angle E is illustrated as exaggerated for illustrative clarity. Alternately, the grilling structure 22b includes the beveled portion.

Food items 38 enter the gap 24 between the grilling structures 22a and 22b through an opening 42. The opening 42 is slightly larger than the gap 24, facilitating the entry of the food items 38 in the gap 24. Although the upper portion 40 of the grilling structure 22a is beveled, the food items 38 in the opening 42 contact both the grilling structures 22a and 22b when in the opening 42, increasing grilling efficiency. That is, the food items 38 are grilled when positioned in the opening 42, even though the opening 42 is slightly larger than the gap 24.

Returning to FIG. 1, the grilling structures 22a and 22b are movable along the x-axis to allow for cleaning of the grilling component 20. Each grilling structure 22a and 22b includes a slider 44 having an opening 46. The opening 46 of the slider 44 receives a rail 48 attached to the frame 50 of the grilling component 20, allowing the grilling structures 22a and 22b to slide relative to the frame 50. The opening 46 of the slider 44 is sized and shaped to receive the rail 48 and to allow the slider 44 to slide along the rail 48. In one example, the rail 48 has a circular cross-section and the opening 46 is circular.

Preferably, the grilling structure 22b is attached to a component 52 to prevent movement of the grilling structure 22b. A protruding portion 54 including a bracket 56 is attached to the component 52. In one example, the protruding portion 54 is attached to the component 52 by bolts. The protruding portion 54 includes a hooked arm 58 that is received over or hooked over a protrusion 60 on the grilling structure 22b, removably attaching the grilling structure 22b to the component 52. In one example, the component 52 is an automated freezer that stores and dispenses the food items 38 into the grilling component 20, such as described in co-pending patent application Ser. No. 10/725,954 entitled "Automated Freezer Component" filed on Dec. 2, 2003. A stop 62 between the grilling structure 22b and the component 52 prevents damage to the grilling component 20 when the grilling structure 22b is slid towards the component 52. In one example, the stop 62 is made of rubber.

When the grilling component 20 is cleaned, the grilling structure 22a is detached from grilling structure 22b, as described below. The grilling structure 22a can slide along the rail 48, as shown by the left set of grilling structures 22a and 22b of FIG. 3. An operator grabs a handle 64a of the grilling structure 22a and pulls the grilling structure 22a to slide the grilling structure 22a away from the grilling structure 22b. In this position, the grilling component 20 can be cleaned. The grilling structure 22b is secured to the component 52 and is not slid due to this attachment. After cleaning, the grilling structure 22a is reattached to the grilling structure 22b, as explained below, to prevent grilling structure 22a from sliding.

The grilling structure 22b can be detached from the component 52 to also allow the grilling structure 22b to slide. The hooked arm 58 is lifted from the protrusion 60, detaching the grilling structure 22b from the component 52. The grilling structure 22b can then be slid relative to the frame 50. An operator would grab the handle 64b of the grilling structure 22b to slide the grilling structure 22b. The grilling structure 22b is reattached to the component 52 by moving the grilling structure 22b proximate to the component 52 and re-positioning the hooked portion 58 over the protrusion 60.

The heating components 26a and 26b are also moveable in the z direction relative to the grilling structures 22a and 22b, respectively, allowing the heating components 26a and 26b to be removed from the grilling structures 22a and 22b, respectively, for cleaning. Although only grilling structure 22b is described, it is to be understood that the grilling structure 22a includes the same features.

Figure 6:
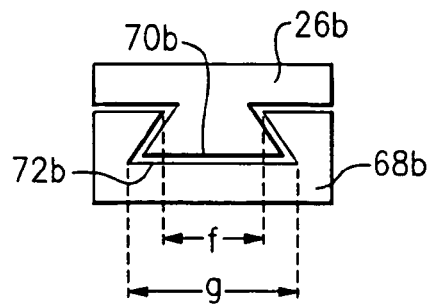
FIG. 6 schematically illustrates a cross-sectional view of the rail of the heating component received in the track of the frame of the grilling structure.
Figure 4:
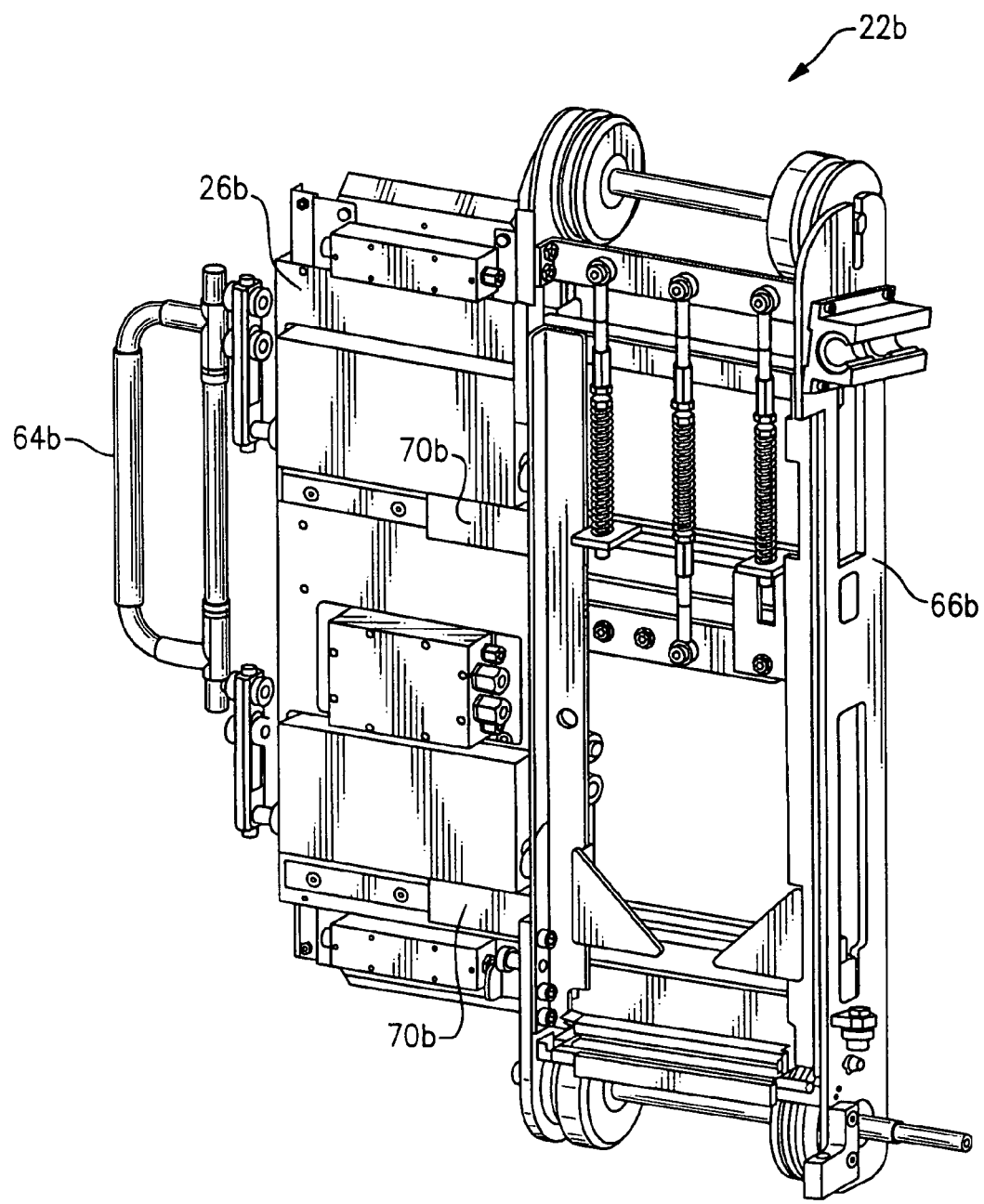
FIG. 4 schematically illustrates a rear perspective view of a grilling structure with the heating structure removed.
Figure 5:
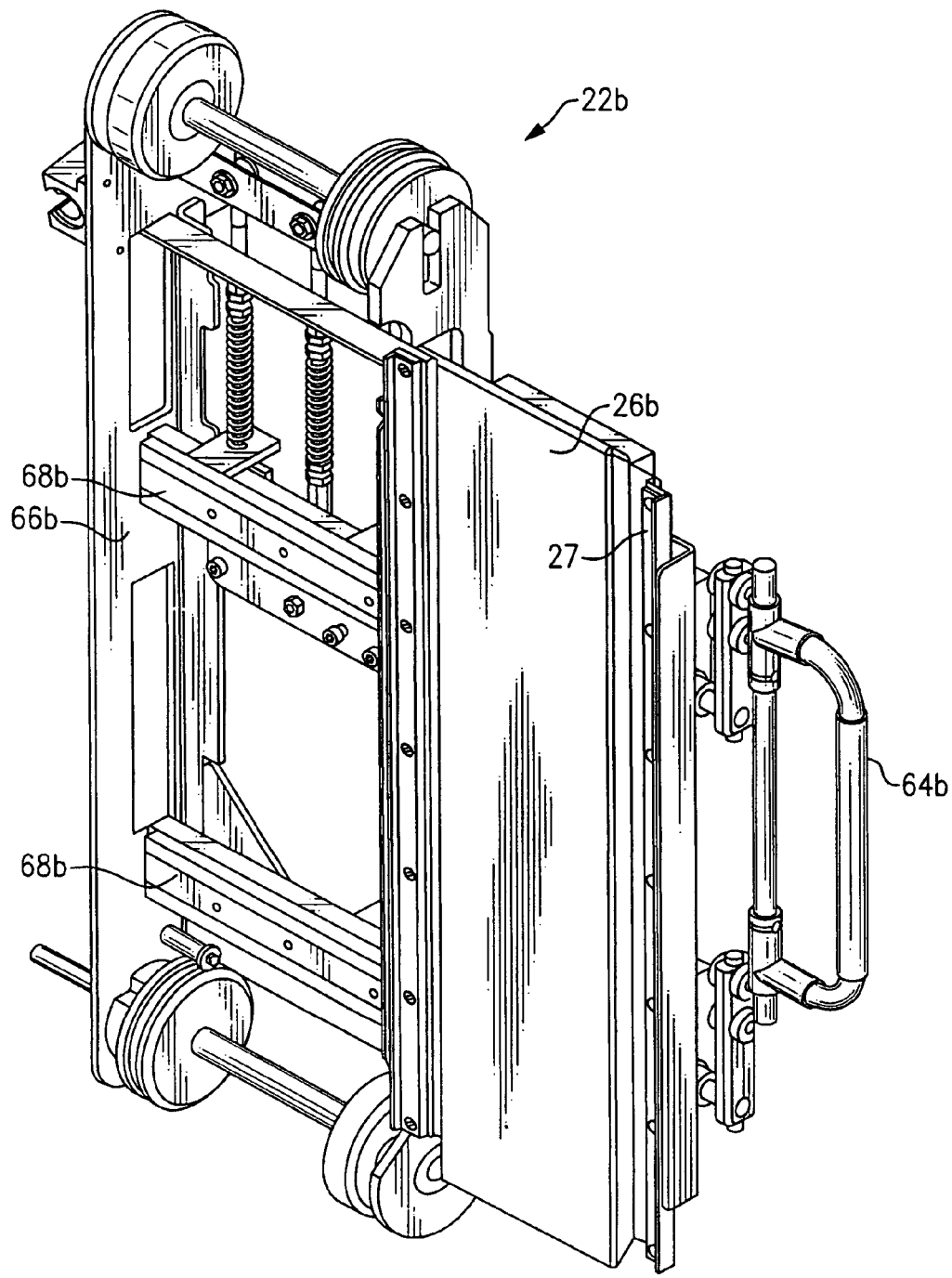
FIG. 5 schematically illustrates a front perspective view of the grilling structure with the heating structure removed.

FIGS. 4 and 5 illustrate the grilling structure 22b with the heating component 26b slid relative from the frame 66b of the grilling structure 22b. The frame 66b of the grilling structure 22b includes two tracks 68b, and the heating component includes two rails 70b each positioned to align with one of the tracks 68b. As shown in FIG. 6, the track 68b includes a trapezoidal shaped opening 72b, and the rail 70b of the heating component 26b is trapezoidal shaped. As the track 68b and the rail 70b are trapezoidal, the largest dimension g of the rail 70b is greater than the largest dimension f of the opening 72b of the track 68b, retaining the rail 70b in the track 68b. However, it is to be understood that other shapes of the rail 70b and the opening 72b are possible.

When the grilling component 20 is in use, the heating components 26a and 26b are in the position shown in FIG. 1. A latching mechanism 27 retains the heating components 26a and 26b in the in-use position. When the latching mechanism 27 is released, the heating component 26b can slide relative to the frame 66b of the grilling structure 22b. In one example, the latching mechanism 27 is spring loaded. A user pulls the handle 64b to pull the heating component 26b from the grilling structure 22b. As the heating component 26b slides relative to the grilling structure 22b, the rail 70b slides and is retained within the track 68b. When the heating component 26b is slid to the position illustrated in FIGS. 4 and 5, the heating component 26b can be removed and cleaned.

The heating component 26b is returned to the in-use position by engaging the rail 70b in the opening 72b and sliding the heating component 26b into the grilling structure 22b in the reverse direction. The latching mechanism 27 engages the heating component 26b to retain the heating component 26b in the grilling structure 22b in the in-use position.

Figure 7:
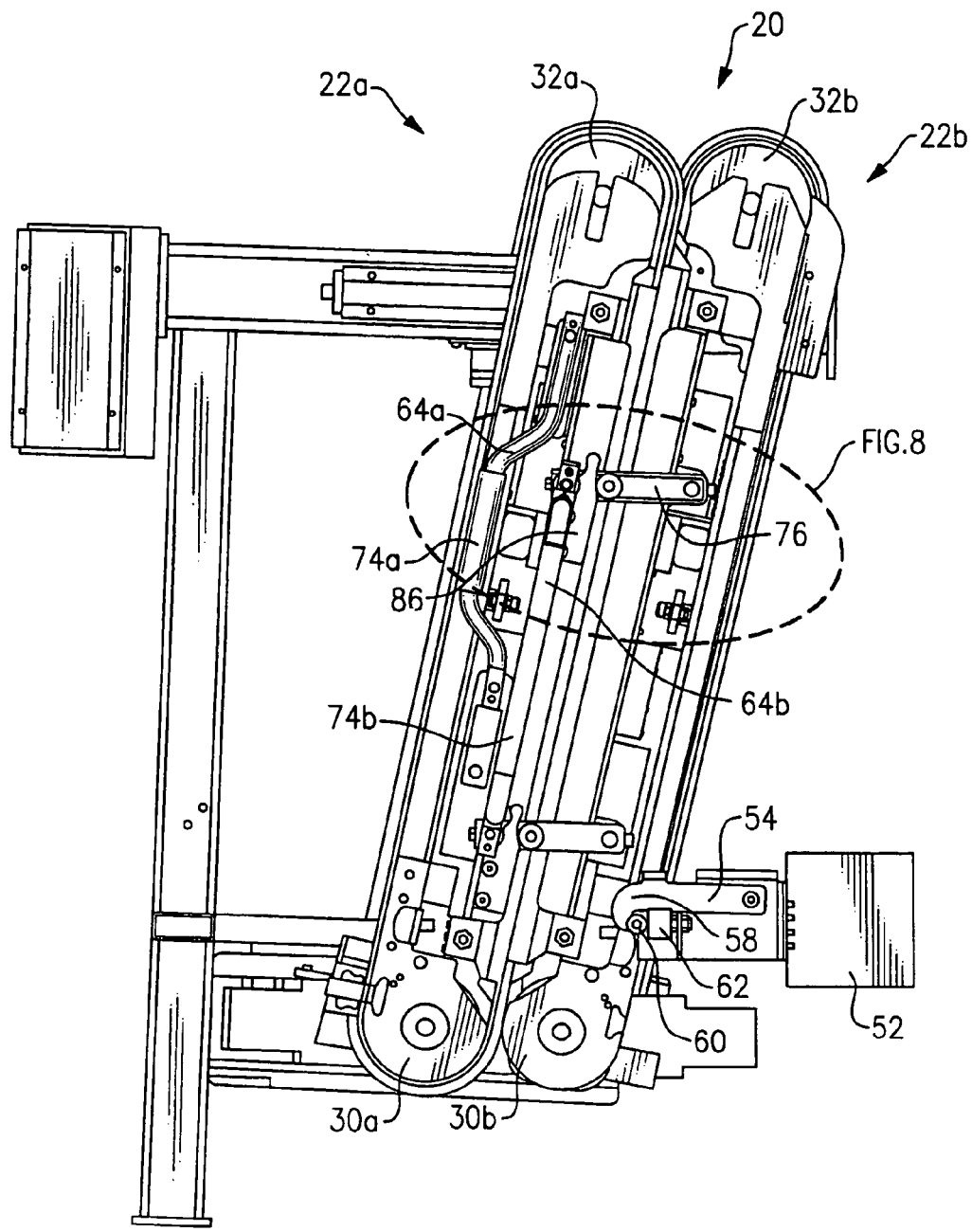
FIG. 7 schematically illustrates another side view of the grilling component.

The gap 24 separating the grilling structures 22a and 22b is adjustable between a small gap and a large gap. As shown in FIG. 7, the grilling structures 22a and 22b each include a handle 64a and 64b, respectively, having a gripping portion 74a and 74b, respectively, that is gripped and handled by an operator.

The handle 64a of the grilling structure 22a does not pivot relative to the grilling structure 22a. The handle 64b of the grilling structure 22b is moveable relative to the grilling structure 22b between an attached position (shown in FIG. 1) and an unattached position (shown in FIG. 3).

Figure 8:
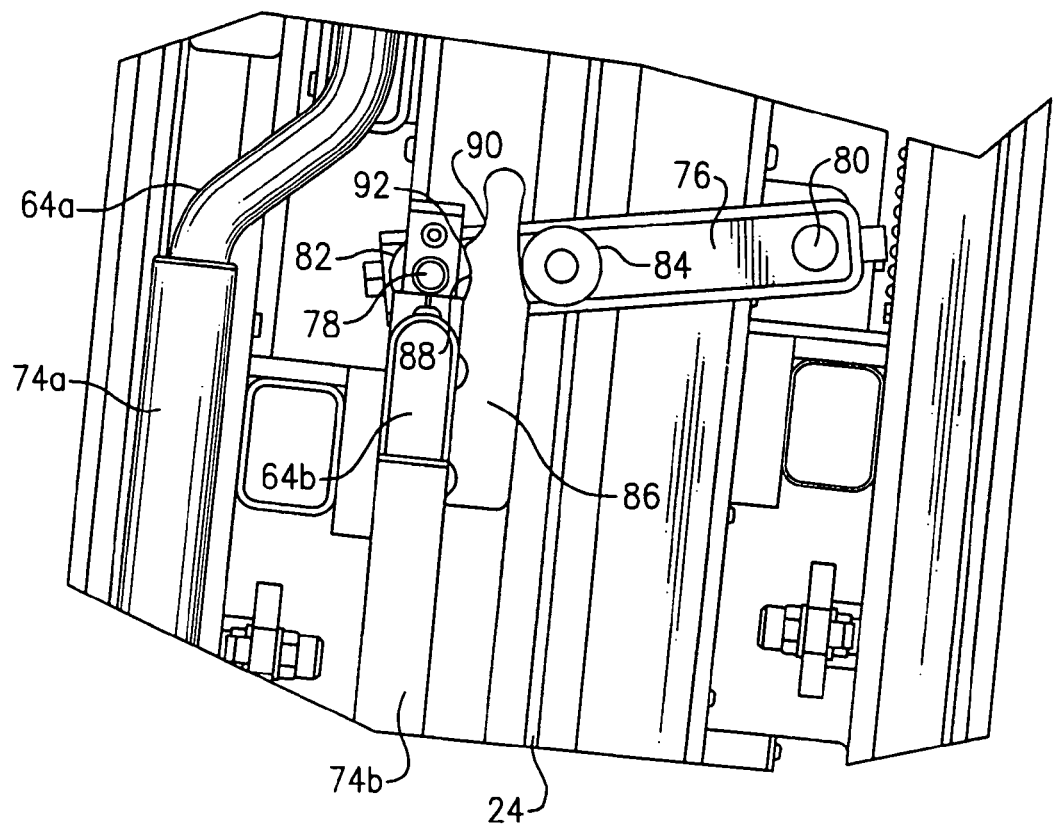
FIG. 8 schematically illustrates an enlarged view of a section of FIG. 7 showing the adjustment mechanism.

As further shown in FIG. 8, each end of the handle 64b is pivotally attached to an arm 76 at a pivot point 78. Each arm 76 is also pivotally attached to the grilling structure 22b at a pivot point 80. A first bearing 82 and a second bearing 84 are pivotally received in each arm 76. As shown in FIGS. 1, 3, 4, 5, 7 and 8, a set of bearings 82 and 84 are disposed on each of opposing sides of the width of the grilling structure 22b and are received in a respective arm 76, one on each of opposing sides of grilling structure 22b. That is, there is an arm 76 pivotally attached on each side of grilling structure 22b, with a set of bearings 82 and 84. Preferably, there are two sets of arms 76 on each side of grilling structure 22b.

Returning to FIG. 8, each grilling structure 22a includes an attachment arm 86 secured to the grilling structure 22a and positioned to engage with one of the arms 76 of the grilling structure 22b. The attachment arm 86 is not pivotally attached to grilling structure 22a. There is one attachment arm 86 of the grilling structure 22a for every arm 76 of the grilling structure 22b.

Each attachment arm 86 includes a first arched portion 88, a second arched portion 90, and a raised portion 92 between the arched portions 88 and 90. As shown, the first arched portion 88 is slightly farther away from the pivot point 80 of the arm 76 than the second arched portion 90.

Figure 3:
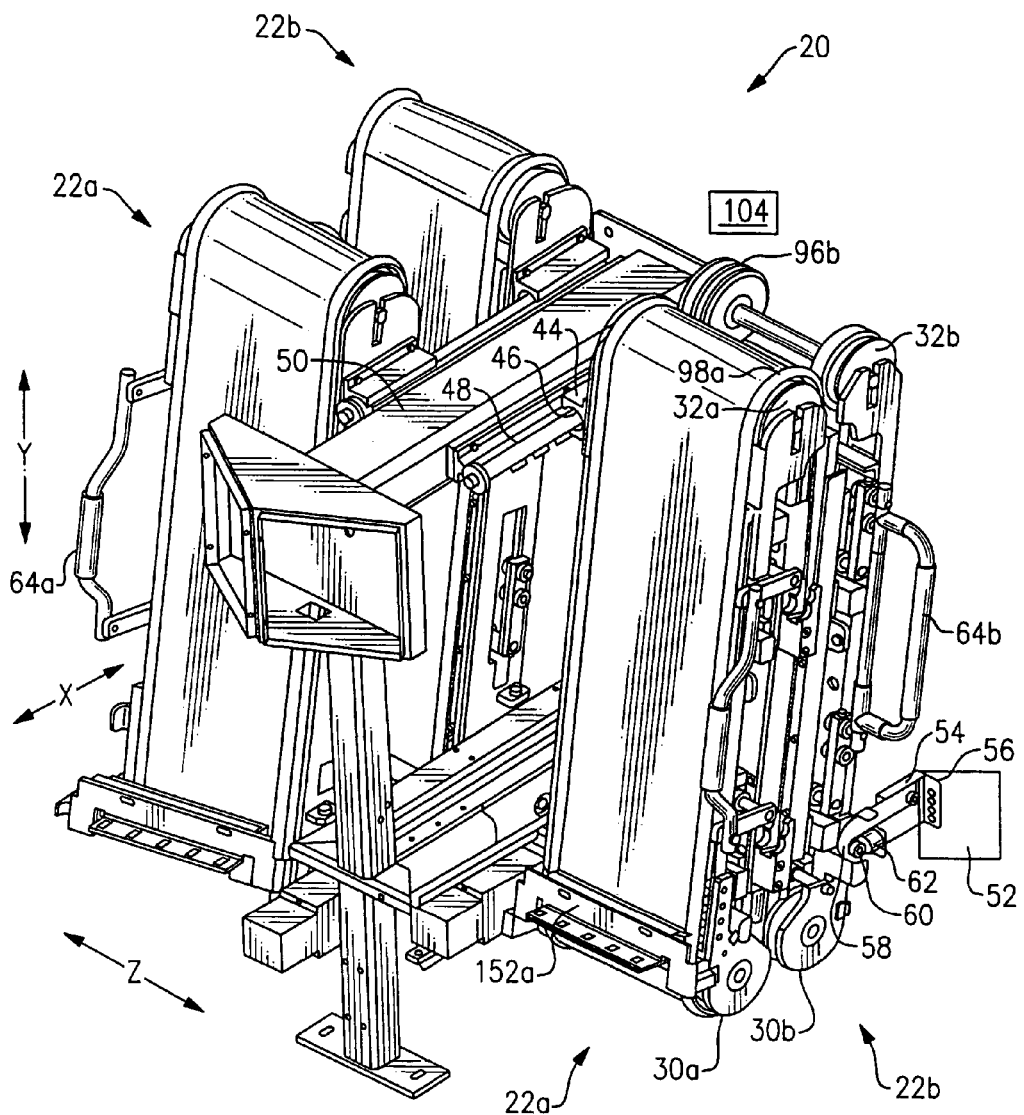
FIG. 3 schematically illustrates a perspective view of a grilling component of the present invention with the grilling structures separated.

FIG. 3 illustrates the handle 64b when the grilling structures 22a and 22b are in an unattached position. In the unattached position, the arm 76 is substantially parallel to the y-axis and the arm 76 does not engage the attachment arm 86 of the grilling structure 22a. When the grilling structures 22a and 22b are to be attached, the handle 64b of the grilling structure 22b is moved and pivoted by an operator towards the grilling structure 22a until the bearings 82 and 84 are received between one of the arched portions 88 and 90. In this position, the arm 76 is substantially parallel to the x-axis, as shown in FIG. 1, and the grilling structures 22a and 22b are attached.

Returning to FIG. 8, the arched portion 88 is received between the bearings 82 and 84, forming a small gap 24 between the grilling structures 22a and 22b. In this position, the surface of the bearing 82 is received in the first arched portion 88. To increase the size of the gap 24, an operator moves the handle 64b upwardly in the y direction such that the arched portion 90 is received between the bearings 82 and 84. As the handle 64b is moved upwardly, the arm 76 pivots about the pivot points 78 and 80 until the arched portion 90 is received between the bearings 82 and 84. In this position, the surface of the bearing 82 is received in the second arched portion 90. As the surface of the second arched portion 90 is closer to the pivot point 80 than the first arched portion 88, the gap 24 is slightly increased. That is, when the first arched portion 90 is received between the bearings 82 and 84, the grilling structure 22b is moved farther away from the grilling structure 22a, increasing the distance of the gap 24.

The raised portion 92 positioned between the arched portions 88 and 90 assists in retaining the arm 76 in the desired arched portion 88 and 90 and prevents the arm 76 from slipping out of the desired position. When the handle 64b is moved between the arched portions 88 and 90 to change the size of the gap 24, the movement must overcome the raised portion 92 to change between the large gap 24 and the small gap 24.

Figure 9:
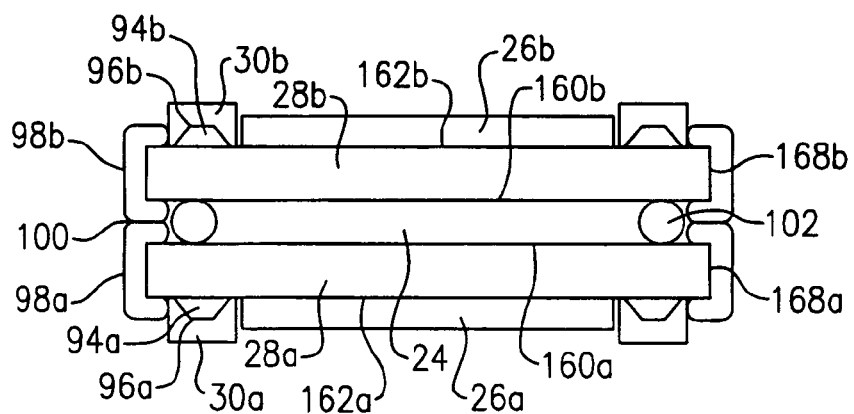
FIG. 9 schematically illustrates a cross-sectional view of the conveyor belt of the grilling components.

FIG. 9 schematically illustrates a cross-sectional view of the conveyor belts 28a and 28b of the respective grilling structures 22a and 22b of the grilling component 20. Each conveyor belt 28a and 28b includes a v-belt 94a and 94b, respectively, on the respective inner surface 160a and 160b of the respective conveyor belt 28a and 28b. In one example, the v-belts 94a and 94b are secured to the conveyor belts 28a and 28b by an adhesive. The v-belts 94a and 94b extend around the entire respective inner surface 160a and 160b of the conveyor belt 28a and 28b, respectively. That is, the v-belts 94a and 94b are continual and endless members. Preferably, there is a v-belt 94a and 94b proximate to both of the respective edges 168a and 168b of each conveyor belt 28a and 28b, respectively. That is, each conveyor belt 28a and 28b has two v-belts 94a and 94b, respectively.

Each v-belt 94a and 94b is received in a groove 96a and 96b of the drive pulley 30a and 30b, respectively, and a groove (not shown) in the non-drive pulley 32a and 32b, respectively. The grooves 96a and 96b are shaped and sized to receive the v-belts 94a and 94b and retain the conveyor belts 28a and 28b on the pulleys 30a, 30b, 32a and 32b. The v-belts 94a and 94b also prevent lateral movement of the conveyor belts 28a and 28b, respectively. The contact of the v-belts 94a and 94b in the grooves 96a and 96b, respectively, of the pulleys 30a, 30b, 32a and 32b also acts as a seal to prevent grease and water from the food items 38 from leaking from the gap 24 and into the heating components 26a and 26b, respectively. Preferably, the v-belts 94a and 94b and the grooves 96a and 96b have a trapezoidal cross-section. However, it is to be understood that other shapes are possible.

Each conveyor belt 28a and 28b also includes an edge seal 98a and 98b, respectively. The edge seals 98a and 98b also contact the inner surface 160a and 160b and the outer surface 162a and 162b of the conveyor belts 28a and 28b and extend around the respective edges 168a and 168b. When the grilling structures 22a and 22b are attached, the edge seals 98a and 98b contact at a contact point 100, creating a seal that prevents the leakage of water and grease out of the gap 24. The edge seals 98a and 98b also extend around the entire edges 168a and 168b of the respective conveyor belt 28a and 28b. That is, the edges seals 98a and 98b are continual and are endless members.

The grilling component 20 further includes a hanging seal 102 that also prevents leakage of grease from the gap 24.

Preferably, each set of grilling structures 22a and 22b includes two hanging seals 102. The hanging seal 102 is connected to a structure 104 (shown in FIG. 1) near the top of the grilling component 20. Preferably, the hanging seals 102 are tubular and made of Kevlar. However, it is to be understood that the hanging seals 102 can be made of another material, and one skilled in the art would know what type of material to use. When the grilling structures 22a and 22b are attached, the hanging seals 102 are compressed between the conveyor belts 28a and 28b and positioned inwardly of the edge seals 98a and 98b to create a seal. The hanging seals 102 also act as a guide for the items of food 38 that travel in the gap 24.

Figure 10:
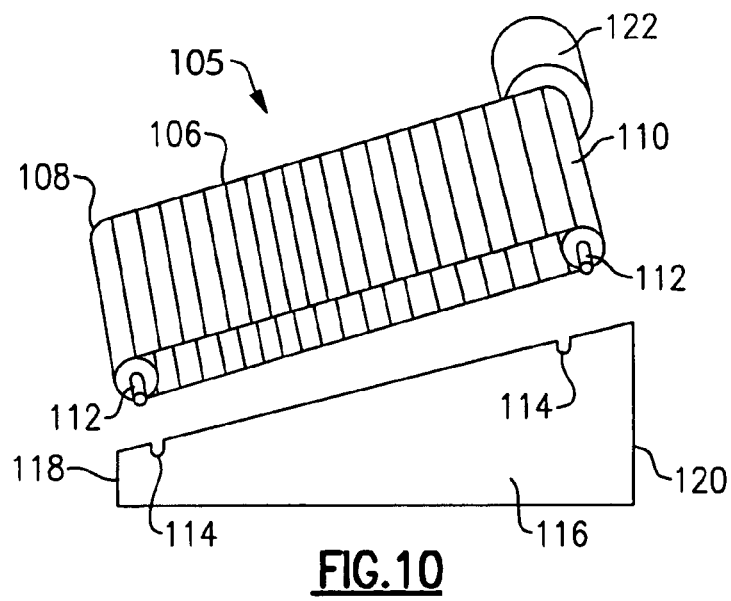
FIG. 10 schematically illustrates a side perspective view of the exit ramp.

Returning to FIG. 2, each item of food 38 exits the grilling component 20 through an exit opening 170 and slides down an exit ramp 105. As shown in FIG. 10, the exit ramp 105 includes an endless member 106 positioned around a non-drive pulley 108 and a drive pulley 110. Preferably, the endless member 106 is made of a plurality of wires. The non-drive pulley 108 and the drive pulley 110 each include a protrusion 112 at the opposing ends. The protrusions 112 of the pulleys 108 and 110 are received in an aperture 114 of an inclined ramp body 116. The ramp body 116 has a short end 118 and a tall end 120. Preferably, the tall end 120 of the ramp body 116 is positioned proximate to the bottom of the gap 24. As the endless member 106 moves, the protrusions 112 rotate in the aperture 114.

Figure 11:
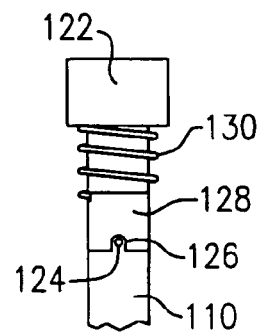
FIG. 11 schematically illustrates the attachment of the motor to the drive-pulley of the exit ramp.

As further shown in FIG. 11, a motor 122 drives the drive pulley 110 to move the endless member 106 around the pulleys 108 and 110. A connecting portion 128 is attached to the motor 122 by a resilient member 130. Preferably, the resilient member 130 is a spring. The drive pulley 110 includes a pin 124 received in a slot 126 of the connecting portion 128. The resilient member 130 biases the connecting portion 128 towards the drive pulley 110 to retain the pin 124 in the slot 126, connecting the motor 122 to the drive pulley 110. Therefore, as the motor 122 turns the connecting portion 128, the drive pulley 110 turns to move the endless member 106.

Figure 12:
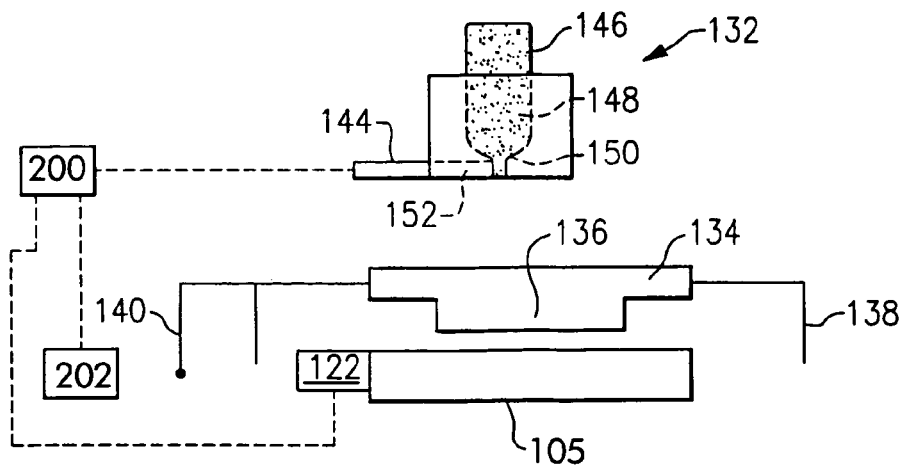
FIG. 12 schematically illustrates the seasoning system of the present invention.

As shown in FIG. 12, the grilling component 20 further includes a seasoning system 132. The seasoning system 132 includes a pivotal flap 134 having a protruding portion 136 in the path of food items 38 as the food items 38 travel along the exit ramp 105. The arms 138 of the flap 134 are attached to the ramp body 116.

When a food item 38 travels down the exit ramp 105, the food item 38 eventually contacts the protruding portion 136 of the flap 134, pivoting the flap 134 approximately 90° from the position shown in FIG. 12. When the flap 134 pivots, an arm 140 attached to the flap 134 also moves and is detected by a sensor 202. The sensor 202 sends a signal to a control 200 that the sensor 202 has been triggered. The control 200 sends a signal to activate a solenoid valve 144 and to stop the motor 122. When the motor 122 stops, the endless member 106 stops moving, stopping the movement of the food item 38.

The seasoning system 132 further includes a bottle 146 of seasoning 148, such as salt, having an opening 150. The opening 150 is positioned substantially over the flap 134. When the solenoid valve 144 is activated, the solenoid valve 144 removes a stop 152 from the opening 150 of the bottle 146, allowing the seasoning 148 to exit the opening 150 and dispense on the food item 38 below.

After the seasoning 148 dispenses, the solenoid valve 144 returns to the non-activated state to prevent seasoning 148 from dispensing from the bottle 146. The control 144 sends a signal to activate the motor 122 and resume movement of the endless member 106 and the food item 38. The cooked food item 38 can then be removed for serving.

Returning to FIG. 1, each grilling structure 22a and 22b also includes a cleaning device 152a and 152b, respectively. The cleaning devices 152a and 152b contact the respective conveyor belt 28a and 28b to remove any grease and food that accumulates on the conveyor belt 28a and 28b during operation.

The grill component 20 of the present invention can be used with an automated grill, such as described in co-pending patent application Ser. No. 10/124,629 entitled "Automated Grill" filed on Apr. 17, 2002. The grilling component 20 can also be used with an automated freezer component, such as described in co-pending patent application Ser. No. 10/725, 954 entitled "Automated Freezer Component" filed on Dec. 2, 2003.

The foregoing description is only exemplary of the principles of the invention. Many modifications and variations are possible in light of the above teachings. It is, therefore, to be understood that within the scope of the appended claims, the invention may be practiced otherwise than using the example embodiments which have been specifically described. For that reason the following claims should be studied to determine the true scope and content of this invention.

What is claimed is:

1. A grilling component for grilling an item comprising:
   a first grilling structure including a first heating structure, a first endless member moveable around the first heating structure, a first grilling surface heated by the first heating structure, a first pulley and a second pulley, wherein a first distance is defined between the first pulley and the second pulley;
   a second grilling structure including a second heating structure, a second endless member moveable around the second heating structure, a second grilling surface defining a plane and heated by the second heating structure, a third pulley, a fourth pulley, and a beveled portion, wherein a second distance is defined between the third pulley and the fourth pulley, the beveled portion extends from the plane at an angle, and the first distance is substantially equal to the second distance; and
   a gap defined between the first grilling structure and the second grilling structure, wherein the item contacts both the first endless member and the second endless member as the item travels through the gap, and
   wherein the first and second grilling surfaces are continuous and have a non-stick coating and wherein the angle is approximately 0.8°.

2. The grilling component as recited in claim 1 wherein the beveled portion is heated by the second heating structure.

3. The grilling component as recited in claim 1 wherein the gap between the first grilling structure and the second grilling structure is adjustable.

4. The grilling component as recited in claim 1
   wherein the first pulley and the third pulley are each a drive pulley having a drive pulley groove and the second pulley and the fourth pulley are each a non-drive pulley having a non-drive pulley groove,
   wherein the first endless member and the second endless member each include two v-belts on an inner surface of each of the first endless member and the second endless member, and
   wherein one of the two v-belts of the first endless member and the second endless member engages the drive pulley groove of the drive pulley of each of the first grilling structure and the second grilling structure and the other of the two v-belts of the first endless member and the second endless member engages the non-drive pulley groove of the non-drive pulley of each of the first grilling structure and the second grilling structure.

5. The grilling component as recited in claim 1
wherein the first endless member includes a pair of first opposing edges and a first edge seal is located on each of the pair of first opposing edges, and
wherein the second endless member includes a pair of second opposing edges and a second edge seal is located on each of the pair of second opposing edges.

6. The grilling component as recited in claim 1 wherein the first endless member is moveable around the first pulley and the second pulley and the second endless member is moveable around the third pulley and the fourth pulley.

7. The grilling component as recited in claim 1 wherein the second endless member is moveable around the beveled portion.

8. The grilling component as recited in claim 1 wherein the first pulley, the second pulley, the third pulley and the fourth pulley have a common diameter.

9. The grilling component as recited in claim 1 wherein the first heating structure and the second heating structure are electric resistance heaters.

10. A grilling component for grilling an item comprising:
a first grilling structure including a first heating structure, a first endless member moveable around the first heating structure, a first surface heated by the first heating structure, a first pulley and a second pulley, wherein a first distance is defined between the first pulley and the second pulley;
a second grilling structure including a second heating structure, a second endless member moveable around the second heating structure, a second surface defining a plane and heated by the second heating structure, a third pulley, a fourth pulley, and a beveled portion, wherein a second distance is defined between the third pulley and the fourth pulley, the beveled portion extends from the plane at an angle, and the first distance is substantially equal to the second distance;
a gap defined between the first grilling structure and the second grilling structure; and
a frame, wherein the first grilling structure and the second grilling structure each include a slider that is slidable along the frame to move the first grilling structure and the second grilling structure relative to the frame in a substantially horizontal direction.

11. The grilling component as recited in claim 10 wherein the second grilling structure is removably attached to a second component, and the first grilling structure is slidable relative to the second grilling structure in the substantially horizontal direction.

12. The grilling component as recited in claim 10 further including an exit ramp positioned proximate to an exit of the gap of the grilling component, a sensor, and a seasoning device to dispense seasoning, wherein the seasoning device dispenses the seasoning on the item when the sensor detects the item is located on the exit ramp.

13. The grilling component as recited in claim 10 wherein the first grilling structure and the second grilling structure extend approximately 5° from a vertical plane.

14. A grilling component for grilling an item comprising:
a first grilling structure including a first heating structure, a first endless member moveable around the first heating structure, a first surface heated by the first heating structure, a first pulley and a second pulley, wherein a first distance is defined between the first pulley and the second pulley;
a second grilling structure including a second heating structure, a second endless member moveable around the second heating structure, a second surface defining a plane and heated by the second heating structure, a third pulley, a fourth pulley, and a beveled portion, wherein a second distance is defined between the third pulley and the fourth pulley, the beveled portion extends from the plane at an angle, and the first distance is substantially equal to the second distance; and
a gap defined between the first grilling structure and the second grilling structure,
wherein the first grilling structure and the second grilling structure each include a rail received in a track for slidably mounting the first and second heating structures to the first and second grilling structures, respectively,
wherein the first heating structure and the second heating structure each include a heater platen over which the first and second endless members run, respectively, and
wherein the first heating structure and the second heating structure are slidable relative to the first grilling structure and the second grilling structure, respectively, to move the first heating structure and the second heating structure relative to the first grilling structure and the second grilling structure, respectively.

15. A grilling component for grilling an item comprising:
a first grilling structure including a first heating structure, a first endless member moveable around the first heating structure, a first grilling surface heated by the first heating structure, a first pulley and a second pulley, wherein a first distance is defined between the first pulley and the second pulley;
a second grilling structure including a second heating structure, a second endless member moveable around the second heating structure, a second grilling surface defining a plane and heated by the second heating structure, a third pulley, a fourth pulley, and a beveled portion, wherein a second distance is defined between the third pulley and the fourth pulley, the beveled portion extends from the plane at an angle, and the first distance is substantially equal to the second distance; and
a gap defined between the first grilling structure and the second willing structure, wherein the item contacts both the first endless member and the second endless member as the item travels through the gap, and
wherein the first and second grilling surfaces are continuous and have a non-stick coating,
wherein the first grilling structure includes a first arm having a first surface and a second surface,
wherein the second grilling structure includes a second arm pivotally attached to the second grilling structure and including two bearings, and when one of the first surface and the second surface is received between the two bearings, the grilling component is in an attached position, and
wherein the gap has a first dimension when the first surface is positioned between the two bearings and the gap has a second dimension when the second surface is positioned between the two bearings.

16. The grilling component as recited in claim 15 further including two of the first arm each located on one of an opposing first side of the first grilling structure and two of the second arm each located on one of an opposing second side of the second grilling structure.

17. A grilling component for grilling an item comprising:
a first grilling structure including a first heating structure, a first endless member moveable around the first heating structure, a first surface heated by the first heating structure, a first pulley and a second pulley, wherein a first distance is defined between the first pulley and the second pulley;

a second grilling structure including a second heating structure, a second endless member moveable around the second heating structure, a second surface defining a plane and heated by the second heating structure, a third pulley, a fourth pulley, and a beveled portion, wherein a second distance is defined between the third pulley and the fourth pulley, the beveled portion extends from the plane at an angle, and the first distance is substantially equal to the second distance; and a gap defined between the first grilling structure and the second grilling structure, wherein the first endless member includes a pair of first opposing edges and a first edge seal is located on each of the pair of first opposing edges;

wherein the second endless member includes a pair of second opposing edges and a second edge seal is located on each of the pair of second opposing edges, and wherein each of the first edge seals contacts one of the second edge seals at a contact point.

18. The grilling component as recited in claim 17 further including a seal positioned between the first heating structure and the second heating structure.

19. A grilling component for grilling an item comprising:

a first grilling structure including a first heating structure, a first endless member moveable around the first heating structure, the first endless member having a first grilling surface heated by the first heating structure;

a second grilling structure including a second heating structure, a second endless member moveable around the second heating structure, the second endless member having a second grilling surface defining a plane and heated by the second heating structure;

a gap defined between the first grilling structure and the second grilling structure wherein the item contacts both the first endless member and the second endless member as the item travels through the gap;

wherein the first endless member includes a pair of first opposing edges and a first edge seal is located on each of the pair of first opposing edges, and wherein the second endless member includes a pair of second opposing edges and a second edge seal is located on each of the pair of second opposing edges, the edge seals for preventing grease and water from leaking onto the heating structures, and wherein the first edge seals and the second edge seals together seal the sides of the gap between the first grilling structure and the second grilling structure.

20. The grilling component as recited in claim 19 wherein each of the first edge seals contacts one of the second edge seals.

21. The grilling component as recited in claim 19 wherein the first and second grilling surfaces are continuous and have a non-stick coating.

22. The grilling component as recited in claim 19 further comprising a pair of hanging seals compressed by the first endless member and the second endless member and located between the first edge seals.

* * * * *

UNITED STATES PATENT AND TRADEMARK OFFICE
CERTIFICATE OF CORRECTION

PATENT NO. : 7,763,830 B2  Page 1 of 1
APPLICATION NO. : 11/474641
DATED : July 27, 2010
INVENTOR(S) : Jeffrey L. Sands et al.

It is certified that error appears in the above-identified patent and that said Letters Patent is hereby corrected as shown below:

Col. 10, line 42, delete "willing" and insert therefor --grilling--.

Signed and Sealed this

Sixteenth Day of November, 2010

David J. Kappos
*Director of the United States Patent and Trademark Office*